(12) United States Patent
Kuntze-Fechner

(10) Patent No.: US 8,858,178 B2
(45) Date of Patent: Oct. 14, 2014

(54) ROTOR WING WITH INTEGRATED TENSION-TORQUE-TRANSMISSION ELEMENT AND METHOD FOR ITS PRODUCTION

(75) Inventor: Gerald Kuntze-Fechner, Waakirchen (DE)

(73) Assignee: Airbus Helicopters Deutschland GmbH, Donauwoerth (DE)

( * ) Notice: Subject to any disclaimer, the term of this patent is extended or adjusted under 35 U.S.C. 154(b) by 1207 days.

(21) Appl. No.: 12/767,053

(22) Filed: Apr. 26, 2010

(65) Prior Publication Data

US 2010/0278649 A1    Nov. 4, 2010

(30) Foreign Application Priority Data

Apr. 29, 2009   (EP) .................................... 09400016

(51) Int. Cl.
| B64C 27/473 | (2006.01) |
| B64C 27/33 | (2006.01) |
| B29D 99/00 | (2010.01) |
| B29C 70/54 | (2006.01) |
| B29L 31/08 | (2006.01) |

(52) U.S. Cl.
CPC ............. B64C 27/473 (2013.01); B64C 27/33 (2013.01); *B29L 2031/082* (2013.01); B29D 99/0025 (2013.01); *B64C 2027/4736* (2013.01); B29C 70/545 (2013.01)
USPC .... 416/138; 416/134 A; 416/230; 416/241 A; 416/226; 416/239

(58) Field of Classification Search
USPC ...... 416/134 A, 138, 141, 229 R, 230, 241 A, 416/226, 239, 168 R
See application file for complete search history.

(56) References Cited

U.S. PATENT DOCUMENTS

| 3,810,713 A | * | 5/1974 | Joiner ........................... 416/141 |
| 3,950,115 A | | 4/1976 | Euler |
| 4,626,172 A | | 12/1986 | Mouille et al. |
| 4,892,462 A | * | 1/1990 | Barbier et al. ................ 416/226 |
| 5,383,767 A | | 1/1995 | Aubry |

(Continued)

FOREIGN PATENT DOCUMENTS

| DE | 693 07 856 | 7/1997 |
| EP | 1 251 068 | 10/2002 |

(Continued)

OTHER PUBLICATIONS

European Search Report dated Nov. 6, 2009, from corresponding European application.

*Primary Examiner* — Christopher Verdier
(74) *Attorney, Agent, or Firm* — Brooks Kushman P.C.

(57) ABSTRACT

A rotor wing in a fiber-reinforced composite design including fiber layers, in particular for a tail rotor of a rotary wing aircraft, with a rotor blade (1) that includes a blade skin (40, 50) and a blade body (41-57) that includes an aerodynamically effective profile, with a tension-torque-transmission element (3) connected to it, which is designed in one piece with the rotor blade (1), and with fiber layers (42-47) that extend through the tension-torque-transmission element (3) and are scarf-join in the rotor blade (1), is improved in that the fiber layers (42-47) extend right through from the tension-torque-transmission element (3) to the blade body (41-57). Furthermore, a method for producing the rotor wing is described.

15 Claims, 8 Drawing Sheets

(56) References Cited

U.S. PATENT DOCUMENTS

Figure 1:
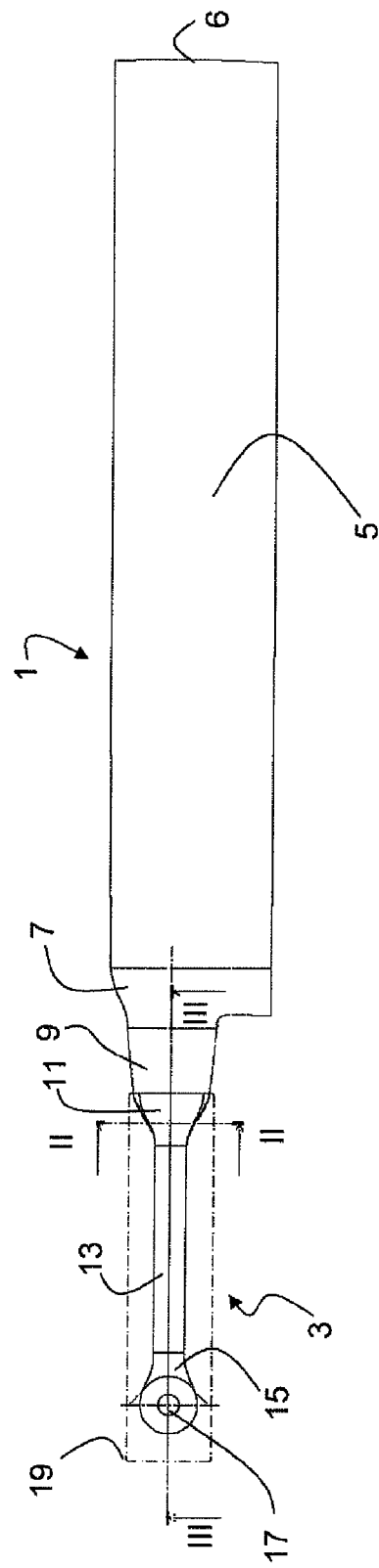

| | | | |
|---|---|---|---|
| 5,755,558 A * | 5/1998 | Reinfelder et al. | 416/230 |
| 6,004,099 A * | 12/1999 | Bansemir et al. | 416/230 |
| 6,227,805 B1 | 5/2001 | Besse et al. | |
| 2003/0086786 A1 * | 5/2003 | Mochida et al. | 416/134 A |

FOREIGN PATENT DOCUMENTS

| | | |
|---|---|---|
| GB | 2 082 964 | 3/1982 |
| GB | 2 131 373 | 6/1984 |
| JP | 10-287297 | 10/1998 |

* cited by examiner

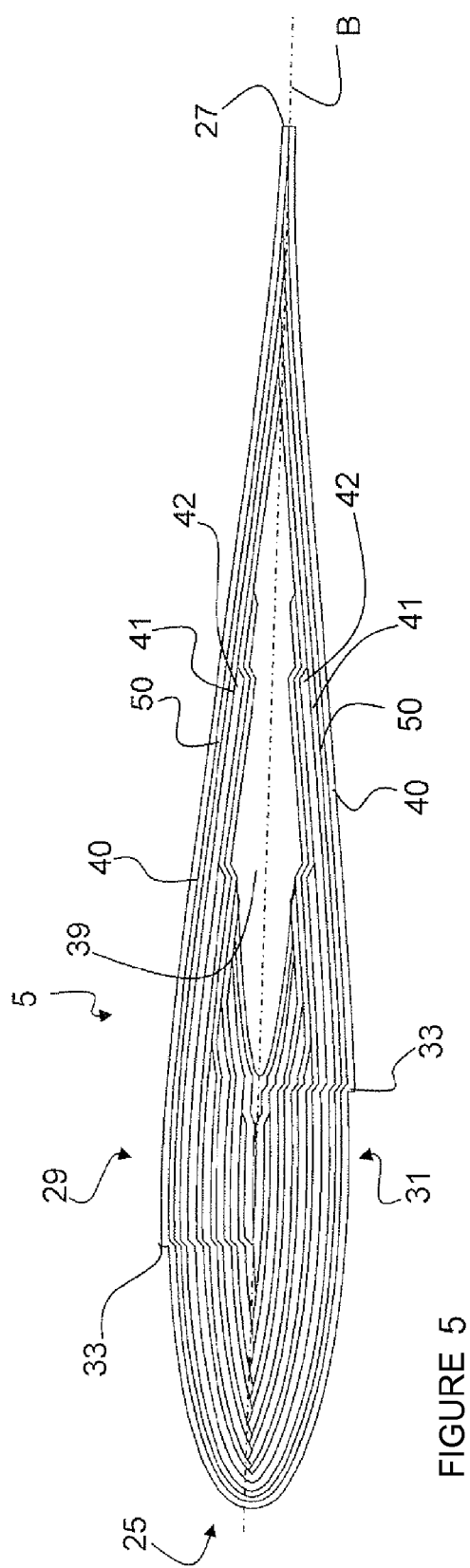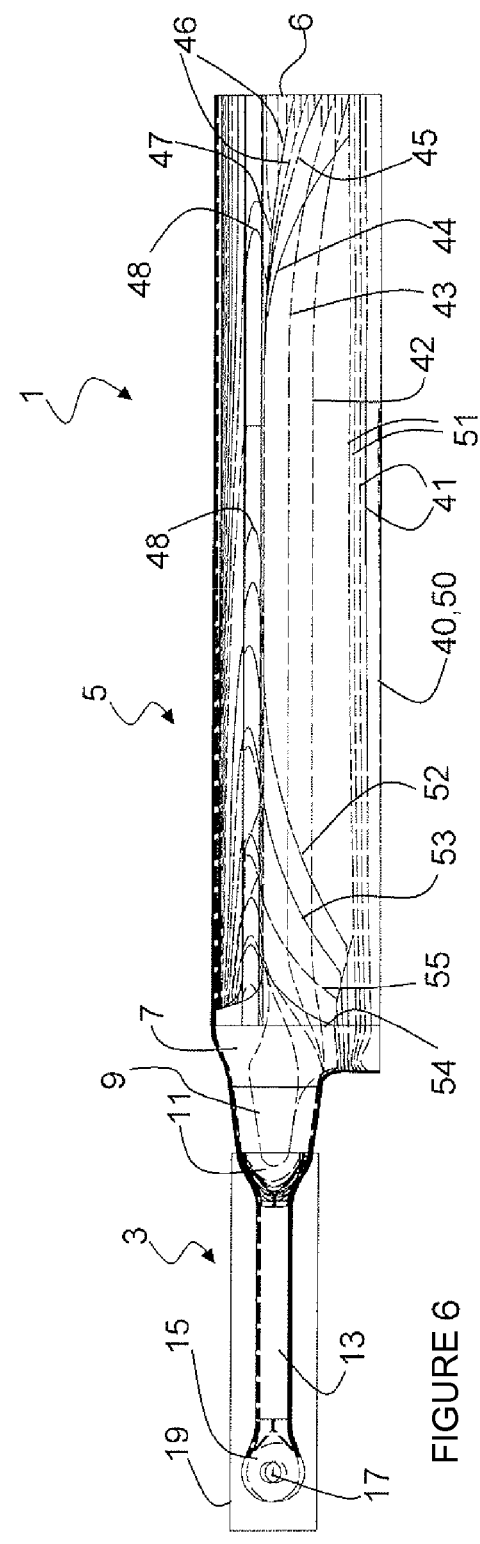

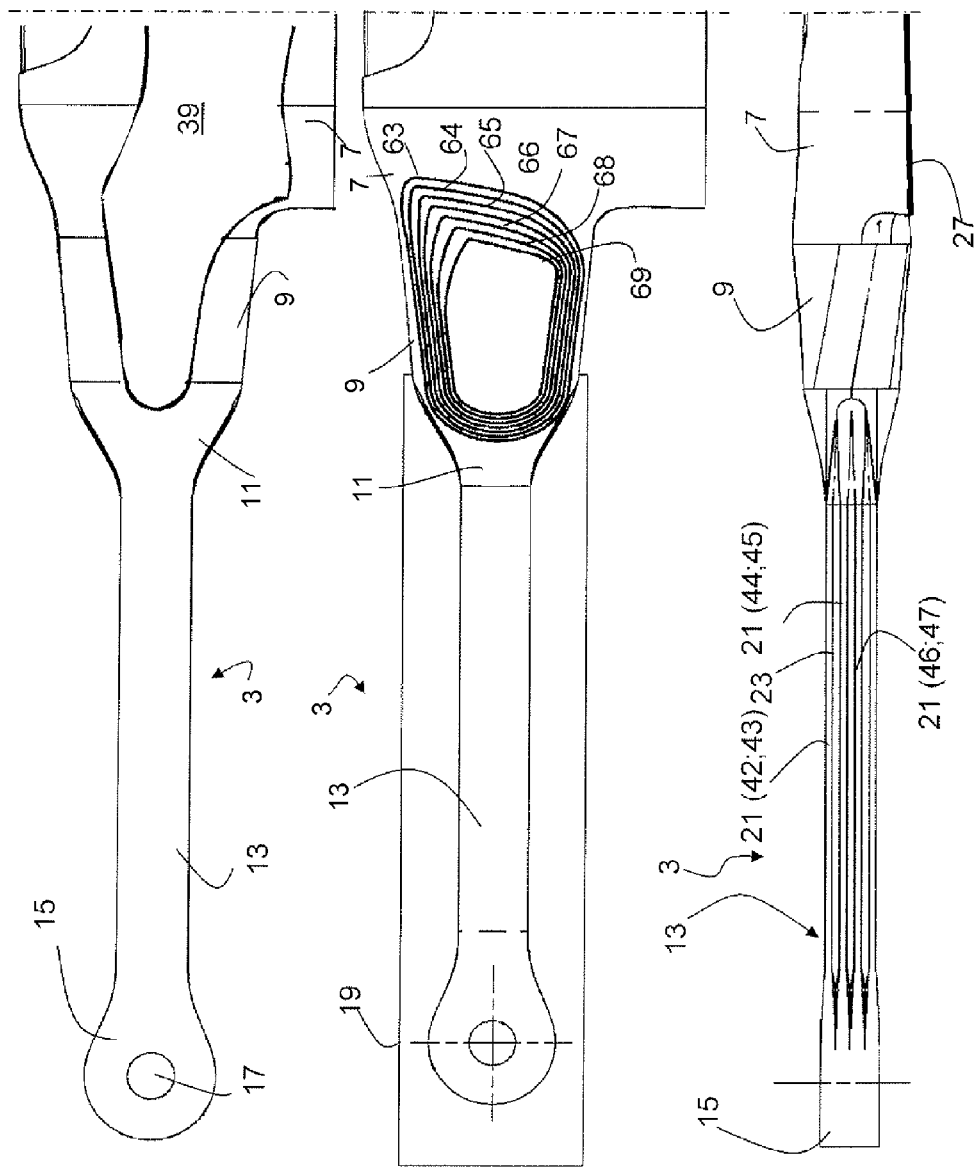

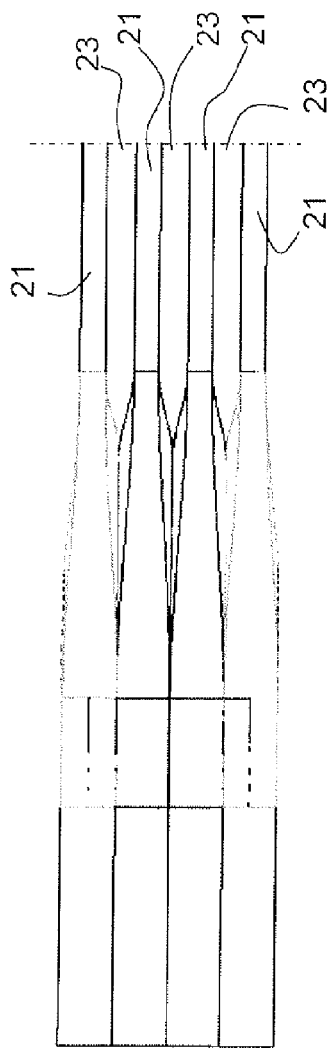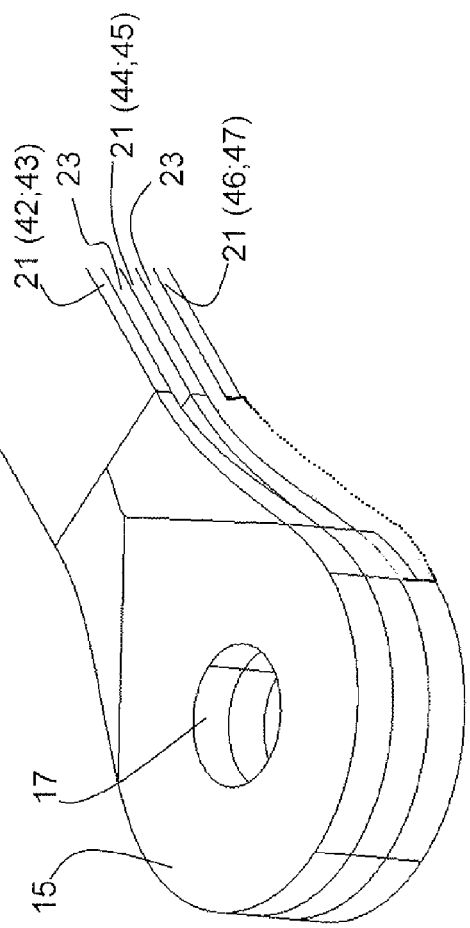
FIGURE 11
FIGURE 10

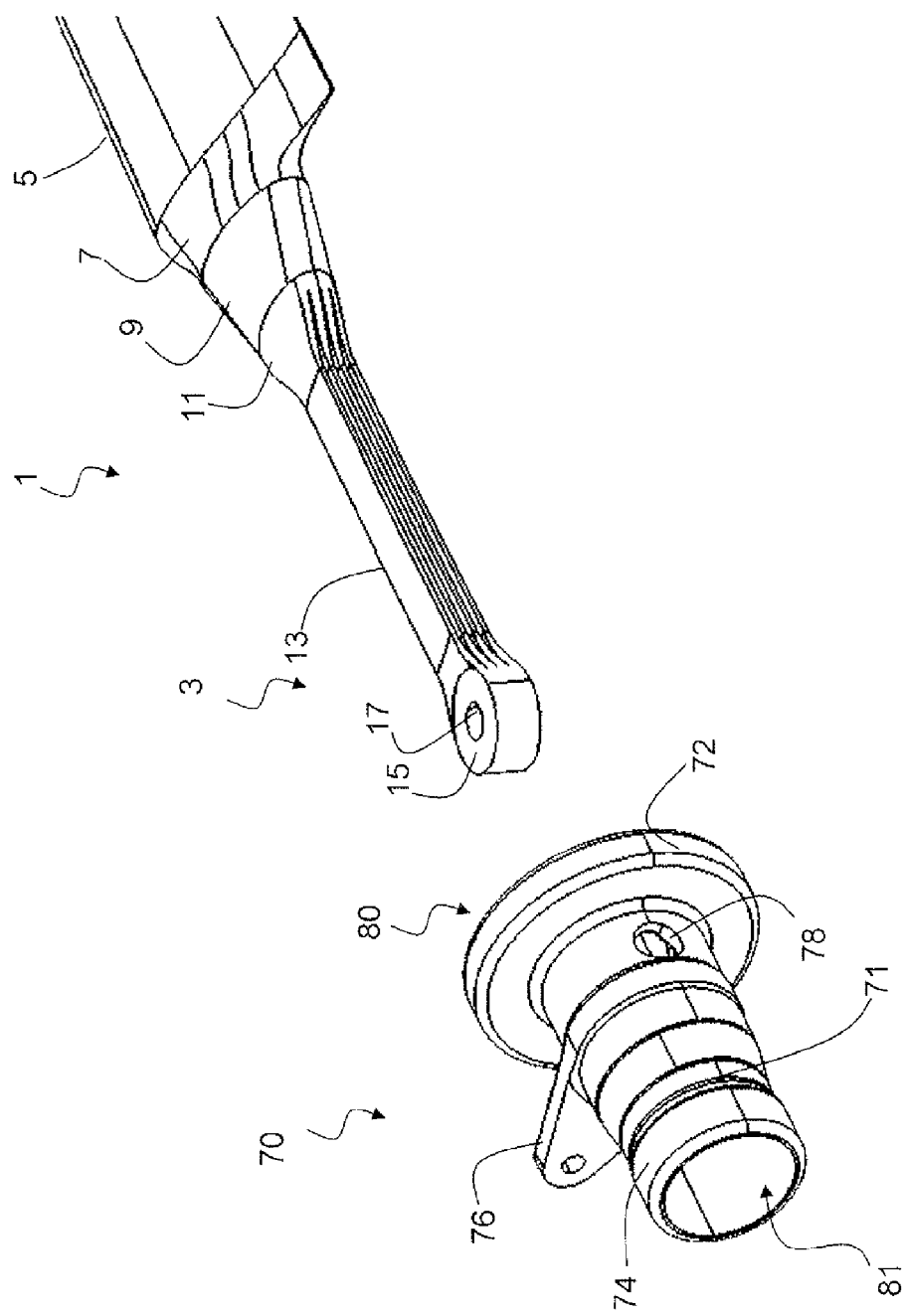

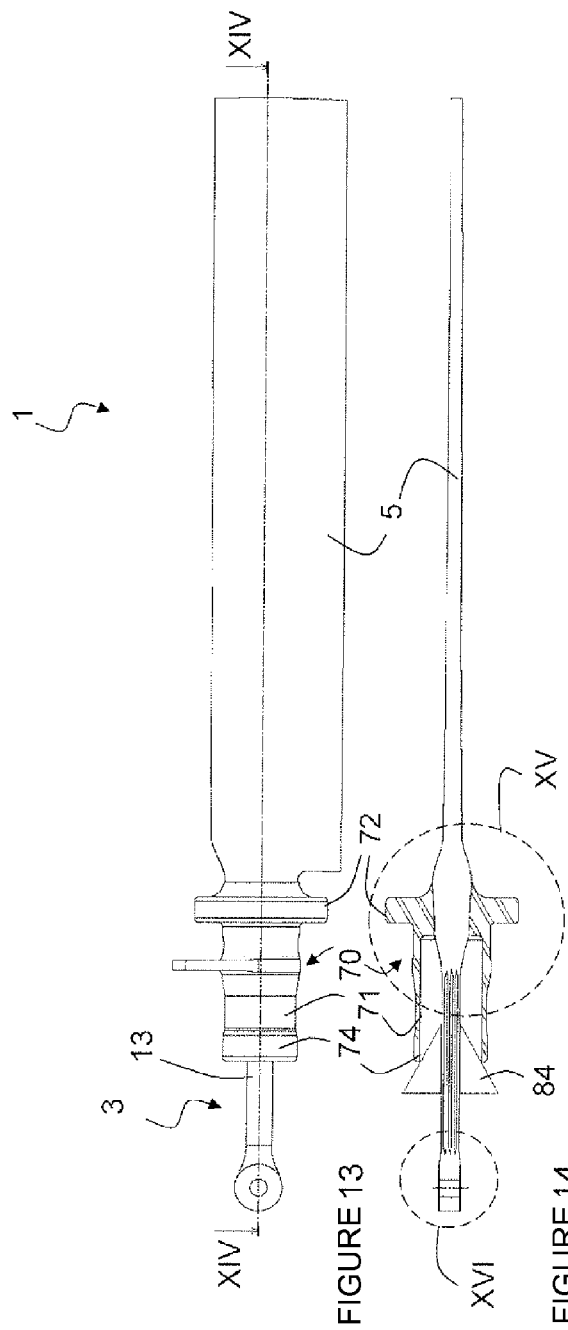
FIGURE 13
FIGURE 14
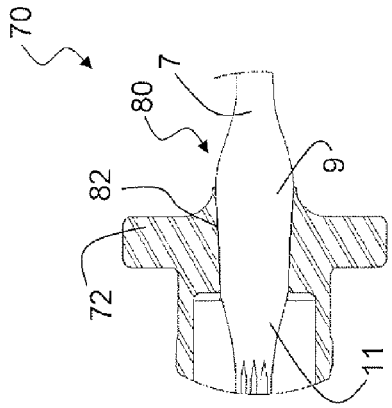
FIGURE 15
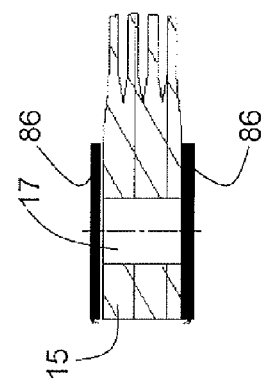
FIGURE 16

ROTOR WING WITH INTEGRATED TENSION-TORQUE-TRANSMISSION ELEMENT AND METHOD FOR ITS PRODUCTION

The invention relates to a rotor wing in a fibre-reinforced composite design comprising fibre layers, in particular for a tail rotor of a rotary wing aircraft or helicopter. The rotor wing comprises a rotor blade with a blade skin and a blade body which comprises an aerodynamically effective profile and comprises a tension-torque-transmission element connected to it, which is designed in one piece with the rotor blade. The fibre layers extend through the tension-torque-transmission element and are incorporated in the rotor blade. The invention furthermore relates to a production method for such a rotor wing.

For reasons related to weight and cost, in particular in aircraft construction there are an increasing number of attempts to replace elements made of metal with components that are produced in a fibre-reinforced composite design. Due to their geometric shape the components need to be suited to this design. They are produced in a mould into which fibre layers are placed, which in turn are pressed together, under the influence of pressure and temperature, by means of a synthetic, reinforced resin. The rotor wings of a shrouded tail rotor, a so-called fenestron, of a helicopter, too, can be produced in the fibre-reinforced composite design.

DE 693 07 856, for example, discloses such a rotor blade. It comprises a connecting device for attachment to the hub of a drive unit of the rotor. The rotor blade is constructed from a rigid shell comprising an aerodynamic profile, which shell extends along the entire length of the span of the blade and is extended by a tubular blade base on the side connected to the hub. Said rotor blade moreover comprises a resistant supporting framework that at least in parts is accommodated lengthwise in the shell and is connected to said shell. Furthermore, on the side connected to the hub, the rotor blade ends in a root part that comprises at least one rotatable connecting bundle of the blade, wherein this bundle essentially extends in the longitudinal extension of the shell and is rotatable on its longitudinal axis. Said bundle is also made from fibre-reinforced material which essentially comprises fibres that extend in one direction and that are pressed through a stiffened synthetic resin. The bundle is connected to the supporting framework, crosses the blade base, and extends outside the shell into an end region that is designed to connect the bundle and thus the rotor blade to the hub. At its end region the bundle comprises a reinforced head, which head supports retention means of the hub. As an alternative to this, the rotatable bundle, instead of comprising an end region, can end in a loop through which a bolt for connection to the hub can be pushed. While the production of the rotor blade, and in particular of the bundle in an end region, seems to be simple, it has, however, been shown to lack damage tolerance and to have too short a service life. Its impending failure is not evident, and cannot easily be detected even during inspection. The rotor blade thus does not provide a practicable solution.

It is thus the object of the invention to state a rotor blade, in particular for fenestron rotors, which rotor blade, despite its manufacture in a fibre-reinforced composite design, features a long service life and damage-tolerant behaviour, is of a low-maintenance nature and is as uncomplicated as possible to produce.

In the rotor wing mentioned in the introduction this object is met in that the fibre layers extend right through from the tension-torque-transmission element to the blade body. The invention thus turns away from the design of a rotor wing comprising a stable shell and a separate supporting framework connected to it. Instead, the invention pursues the principle of a self-supporting shell that renders a separate supporting framework superfluous. The shell itself is sufficiently stable and rigid to absorb and remove all the forces acting on it. The self-supporting shell essentially comprises a blade body that is covered by a thin blade skin and that provides the rotor blade with what will be its aerodynamically effective shape. The blade body comprises fibre layers that extend not only along the entire blade body, but without any interruption make a transition to, or are, seamlessly and so as to be flat, integrated in, the tension-torque-transmission element. The rotor blade thus comprises fibre layers that form not only the blade body but also the tension-torque-transmission element. In this way they can extend continuously from the tip of the rotor blade along its entire length through the tension-torque-transmission element right into its connecting section on the end of the tension-torque-transmission element that is opposite the blade tip. By combining the function of the shell on the one hand, and of the supporting framework on the other hand, in a single component, namely the self-supporting blade body, the mass of the rotor blade and the number of components and production steps necessary for its production can be reduced. Furthermore, there is no longer any need to provide a connection between the shell on the one hand, and the supporting framework on the other hand, which connection would otherwise have to be produced in a separate production step. In this way a possible source of errors is excluded, and the production effort relating to the rotor blade is reduced.

The through-fibres are loaded in their longitudinal direction and are thus optimally loaded because they extend in the direction of the centrifugal force, which acts predominantly when the rotor is used. As a result of this alignment of the fibres, which alignment corresponds to the load, the individual fibre layers have greater load-bearing capacity, so that fewer fibre layers are required to achieve the same loadability. This results in a flat and space-saving design that moreover results in a reduction in the weight of the rotor wing.

Depending on a concrete geometry of the profile region of the rotor blade, the rotor wing is given a so-called angle of incidence relative to the rotation plane in which said rotor wing rotates in operation. The angles of incidence are predetermined for aerodynamic reasons. Since the rotor blade is inclined relative to its rotation plane in the tail rotor by an angle of incidence of max. 20°, the individual fibre layers, too, are given a slight rotation of max. 20°. The rotation is sufficiently small to prevent any delamination as a result of transverse tensile strain. Moreover, the structure is stable to such an extent that the load-bearing capacity of the fibre layers is still ensured even if delamination should occur. In particular because the fibre layers of the tension-torque-transmission element are not covered up by other components, for example by a control tube, the rotor wing can be checked for damage, in particular for delamination of individual fibre layers, by means of a simple visual inspection.

According to an advantageous embodiment of the invention, the fibre layers comprise spar tapes made of unidirectional fibre material. The spar tapes form individual flat layers whose flow of the fibres extends in the direction of force flux, in other words in the direction of centrifugal force, thus having an excellent load-bearing capacity in this direction. This applies in particular to the tension-torque-transmission element, whose main load is due to centrifugal force. Above all, the design of the tension-torque-transmission element of unidirectional fibre material that is oriented in the direction of load signifies optimal and economical utilisation of materials.

It results in minimal tension in the component, and consequently the rotor blade has a long service life. The simple structure involves a reduced risk of manufacturing errors and ensures good reproducibility of the rotor blade at the same high quality.

According to a further advantageous embodiment of the invention, the spar tapes comprise a rectangular cross section in particular in the region of the tension-torque-transmission element. This results in a simple and economical design, in particular of the tension-torque-transmission element, which design holds out the promise of a reduced risk of errors and thus of high quality.

According to a further advantageous embodiment of the invention, the spar tapes, for forming the aerodynamic profile of the blade body on the one hand, and of the tension-torque-transmission element on the other hand, are arranged so as to be layered, and if need be staggered. Consequently, despite through-fibre layers the very different cross sectional profile both of the rotor blade and of the tension-torque-transmission element can be produced without substantial waste. This leads to a reduction in the cost of producing the rotor wing.

According to a further advantageous embodiment of the invention, the spar tapes are different in width, depending on their height position in the tension-torque-transmission element. Those spar tapes that are arranged in a middle region of the tension-torque-transmission element are designed to be wider than those that are located on the outside, or at the top and bottom. In this way the tension-torque-transmission element obtains its characteristic cross section, which in principle is rectangular and on its narrow sides is slightly bulging or curved.

As is known, the tension-torque-transmission element comprises a bundle of stratified flat fibre layers. Apart from the tensile force from the centrifugal force of the rotating rotor blade, the tension-torque-transmission element has to absorb torsional moments. It therefore to some extent has to be designed so as to be torsionally flexible. This can be achieved by dimensioning of the cross section. For example, a regular rectangular cross section can be dimensioned according to height and width and according to the ratio of height to width in order to achieve corresponding torsional rigidity. As an alternative to this, other cross sections, for example cruciform cross sections, ellipses, hexagons or octagons or variants of these shapes, if need be with incisions or hollow spaces extending in the direction of centrifugal forces, for influencing torsional rigidity can be selected. Thus the tension-torque-transmission element can also, for example, comprise braces that are flat and arranged one on top of the other, or almost square braces that are arranged one beside the other, with the envelope of these braces resulting in a flat rectangular cross section. A cross section comprising several layered spar tapes that essentially extend in the direction of extension of the rotor wing and that are separate from each other, has been shown to be particularly advantageous both as far as torsional rigidity and, in particular, as far as its production are concerned. Several layered spar tapes that are interconnected, together form a lamella, with several lamellae forming the tension-torque-transmission element. Adjacent lamellae can be separated by separation layers so that with suitable dimensions of the cross section the tension-torque-transmission element obtains the desired torsional rigidity. The separation layers between adjacent lamellae decouple the lamellae from each other so that, in the case of twisting, transmission of shearing strain between the lamellae is at least reduced. This nonetheless results in a very compact design of the tension-torque-transmission element.

According to a further advantageous embodiment of the invention, the separation layers can be provided in the form of films between the spar tapes. In addition the films can be suitably coated. They prevent the spar tapes from adhering to one another, and they also completely decouple the individual lamellae from each other so that no transmission of shearing strain can take place at their facing boundary surfaces. To this effect, for example, so-called Tedlar® film can be used as separation layers. It is coated with Teflon® and has been shown to be suitable, in particular adequately resistant and providing good working properties.

According to an alternative embodiment of the invention, slots can be formed between the lamellae, which slots provide an air gap as a separation layer. Thus in this region the facing lateral surfaces of the lamellae no longer contact each other directly; instead they incorporate an air gap between each other. In this way any transmission of shearing strain between individual lamellae is practically excluded. Moreover, the absence of separate separation film provides an advantage in that production of the tension-torque-transmission element becomes simpler and more economical. It should be kept in mind that the separation layers can be subject to aging, to becoming brittle and to swelling due to the influence of temperature and humidity. Furthermore, they can wear as a result of fibre layers chafing against each other due to bending loads and torsional loads. Lamellae that are spaced apart are also associated with an advantage in that they can individually be inspected for any damage.

In this arrangement the height of the slots or the distance between lamellae is to be dimensioned in such a way that even in the case of their intended twisting they do not touch one another. In the dimensioning of the slots between the individual lamellae or in the design of the thickness of the lamellae, the centrifugal force that acts during operation of the rotor wing has a positive effect. This is because the centrifugal force stretches the lamellae, thus resisting any touching of the lamellae.

In order to keep the costs and complexity of producing the torque-transmission element low, the number of lamellae is kept as small as possible. Calculations have shown that with four lamellae of a thickness of approximately 1.13 mm adequate strength and torsional rigidity are provided.

Protection of the torque-transmission element against handling errors during installation is a further criterion in the design of the thickness of the slots and of the lamellae. In other words, the lamella and with them the tension-torque-transmission element are to be dimensioned in such a way that the tension-torque-transmission element cannot manually be over-twisted beyond a permissible torsional angle; this is to prevent a situation in which the component may sustain prior damage already at the time of installation. Calculations of the design of the tension-torque-transmission element indicate a lamella thickness of approximately 1.3 mm, a length of approximately 75 mm, and a favourable width of approximately 12 mm.

According to a further advantageous embodiment of the invention, in the connecting sections of the tension-torque-transmission element on the rotor blade on the one hand, and on the blade connection on the other hand, at the height of the slots additional woven-fabric layers can be arranged. On the one hand they reinforce the connecting sections, which in this way can remove any load introduction, and if applicable load deviation, without sustaining any damage. On the other hand these additional woven-fabric layers produce a space between the lamellae in order to form the separation slots, so that the fibre layers that form the lamellae, when viewed from the side, can extend in a completely planar and straight-line manner through the tension-torque-transmission element. The unidirectional fibre layers of the lamellae are thus optimally loaded, without any deviation of the direction in their plane of extension as a result of the centrifugal force experienced, so that said fibre layers can take over a maximum load with a minimum use of material.

Reliable load transmission from the unidirectional fibre layers to the additional woven-fabric layers takes place by fanning open the unidirectional fibre layers, between which the additional woven-fabric layers are scarf-joined. Since in addition both the unidirectional fibre layers and the additional woven-fabric layers are very thin, a multitude of contact surfaces and bonding surfaces are created between the layers. They ensure damage-free load transmission, because the load can be distributed over a large area so that each individual contact area is not overloaded and thus not in danger of developing cracks. Thus, fanning open and scarf-joining in order to connect the layers ensures damage-tolerant behaviour and an adequate service life of the connection and of the rotor wing overall.

According to a further advantageous embodiment of the invention, the additional woven-fabric layers have a fibre orientation of approximately +/−45° relative to the main direction of extension of the rotor wing or its longitudinal axis. This angular deviation of the fibre orientation, which without incurring any damage can have a tolerance range of +/−10°, causes a load introduction and load distribution into the adjacent lamellae.

According to a further advantageous embodiment of the invention, at the transitions of the separation slots in the connecting sections a continuous transition is formed. Its purpose is, during twisting, in particular in the outer lamellae, to prevent the occurrence of great bending stress that can result from a rigidity step between the end section and the lamellae. In this way the continuous transition provides a continuous increase in the torsional rigidity in the torque-transmission element in order to prevent load peaks in the bending stress, and damage, in particular to the outer lamellae. Thus, the additional woven-fabric layers can be arranged in such a way that in lateral view of the tension-torque-transmission element the lamellae in the transition section continuously increase in thickness until the separation slots are completely filled and the lamellae have quasi grown together to form a uniform block, namely the connecting section. In other words, the additional woven-fabric layers are arranged one on top of the other in a stepped manner starting from the top of a lamella. Furthermore, said layers can also vary in width, for example the first and longest additional woven-fabric layer can be widest, with the following subsequently arranged layers being narrower with increasing height. In this way an almost stepless transition between the lamellae and the connecting sections can be achieved.

As far as the more precise arrangement of the fibre layers in the connecting section on the hub-side is concerned, we furthermore refer to U.S. patent application Ser. No. 12/753,927 filed on Apr. 5, 2010 and published as U.S. Publication 2010/0278655 A1 on Nov. 4, 2010, whose content is expressly also incorporated to form the subject of the present application.

According to a further advantageous embodiment of the invention, the connecting section facing away from the rotor blade comprises a connecting eye by means of which the rotor blade can be attached to the drive device by way of a bolt that essentially extends perpendicularly to its plane of extension. Thus in the simplest case the connecting eye can be designed as a cylindrical opening in the connecting section. It breaks through the individual fibre layers also perpendicularly to their plane of extension. In operation, the connecting eye forms a hole-face connection which loads the fibre layers of the connecting section and thus also those of the tension-torque-transmission elements practically exclusively in their plane of extension, with the load thus being optimal in accordance with the fibres. With force introduction by way of a bolt, no force deviation in the fibre layers occurs by way of the hole-face connection of the connecting eye, which force deviation could result in delamination in the connecting section. Instead, the loaded fibre layers extend almost free of torsion between the connecting eye and the rotor blade. This in turn makes possible maximum loadability with minimum use of materials. This is beneficial in the context of economical production, a long service life, short external dimensions and light weight of the rotor wing.

The connecting section with the connecting eye for introducing the force by means of the hole face thus represents a component that is not disturbed by fibre ends or fibre butt joints, which component instead introduces the force of the bolt optimally into the rotor wing. As a completely undisturbed component it has been shown to have a particularly good load-bearing capacity and can be manufactured with few faults. At an identical design height the connecting eye has a greater load-bearing capacity than an eye produced in the conventional loop design. Its ratio of margin space to diameter should be in the region between 1.3 and 2.0 to ensure optimal strength behaviour.

Moreover, the fibre lengths in which the connecting eye is made extend essentially flat, planar and without twisting of any consequence, quite in contrast to the state of the art, which in the case of a loop provides for twisting of the fibre layers by 90°. The invention thus teaches a design of a rotor wing which despite the constructively favourable design of a connecting eye does not require any disadvantageous twisted fibre layers. Twisting of the fibre layers according to the state of the art requires very precise, and thus expensive and error-prone, positioning of the individual fibre layers. In contrast to this, the design of a bearing laminate is considerably simpler and less sensitive to production faults.

Furthermore, twisting to form a "standing loop" according to the state of the art requires a certain design length. In contrast to this, the "recumbent loop" makes twisting superfluous, which leads to particularly compact dimensions of the rotor wing. Moreover, at the same load-bearing capacity the "recumbent loop" has a lower design height of the connecting section so that it can be more easily integrated in the fenestron pot.

According to a further advantageous embodiment of the invention, the connecting eye is completely formed only in the cured state of the tension-torque-transmission element. It can, for example, be milled or drilled, in any case it can be produced later. This results in a very even and homogeneous margin design of the regular cylindrical hole face of the connecting eye, from which its later production can be detected without any doubt. As a result of the undisturbed margin design, the connecting section is fully loadable up to the margin of the connecting eye, which leads to optimal use of the cross section and thus to minimum dimensions of the connecting section. Optimal use of the cross section is desirable in particular on the connecting eye, because in the fenestron pot several connecting sections need to be arranged one beside the other in a small space, wherein the space requirement of said connecting sections should not have an unfavourable influence on the dimensioning of the fenestron pot.

In relation to further options of designing the torque transmission element, the connecting section and the connecting eye of the tension-torque-transmission element, we refer to U.S. patent application Ser. No. 12/726,564filed on Mar. 18, 2010 and published as U.S. Publication 2010/0278648 A1 on Nov. 4, 2010, whose content relating to this is expressly also incorporated to form the subject of the present application.

A further advantageous embodiment of the invention relates to a rotor wing with a coupling section of the rotor wing between the rotor blade and the tension-torque-transmission element and with a separate control sleeve, or a separate control tube for adjusting the rotor wing along its longitudinal axis, with a connecting section for connecting the control tube to the rotor blade. According to the invention, the coupling section of the rotor wing and the connecting section of the control tube comprise a corresponding cross sectional shape for positive-locking force transmission of control forces between the rotor blade and the control tube. The separate control tube is attached, by way of the connecting section with the connecting eye and the tension-torque-transmission element, to the rotor wing, and in the coupling section is tied to the rotor wing. By way of the corresponding cross-sectional shapes of the coupling section and the tie section, the control forces can be introduced into the rotor wing without damage, without the need for a further connecting element, for example a bolt that extends across the longitudinal axis of the rotor wing.

Favourably, the cross-sectional shapes of the coupling section and of the tie section not only result in the rotor wing resting in a linear manner against the control tube along a circumferential line, but advantageously in a contact surface. With this simple measure, bringing about the force transmission between the control tube and the rotor wing can be effected in a simple and economical way, which apart from savings relating to components and the associated reduction in the danger of assembly errors is also associated with a reduction in expenditure and in weight.

The aerodynamic requirement of the angle of incidence of the rotor blade relative to the rotation plane results in the tension-torque-transmission element, which extends in the rotation plane, being rotated or subjected to torsional movement by precisely that angle of incidence. At any rate, in the case of a single-piece design of the rotor blade and the tension-torque-transmission element, a region must thus be provided in which torsional movement of those fibre layers that form both parts takes place. From the point of view of load considerations, the torsional movement of the fibre layers is of subordinate significance to the extent that on the one hand it only covers a range of 10° to 20°, and on the other hand it extends over a certain minimum distance. In experiments, a length of 20 to 30 mm has been shown to be favourable. As a rule, torsional movement in this length does not yet result in delamination as a result of transverse tensile forces, so that the extension of the fibre layers in the torsion region can still be considered to be essentially planar.

The transition region can, for example, be in a transition section of the rotor blade in the connecting section of the tension-torque-transmission element. According to a further advantageous embodiment of the invention, the region of torsional movement is in that connecting section of the tension-torque-transmission element that faces the rotor blade or is situated in between. By combining the connecting section near the blade with the region of torsional movement the rotor wing can be designed to be shorter because there is no need to provide a separate region of torsional movement. The tail rotor can thus be smaller overall, so that considerable cost savings can be made.

According to a further advantageous embodiment of the invention, the torsional movement between the rotor blade and the tension-torque-transmission element is arranged in that coupling section of the rotor wing that interacts with the tie section of the control sleeve. In this way a region has been found or defined that is of adequate length in order not to cause excessive deflection of the fibre layers in the region of torsional movement. Since aerodynamics assume critical importance also in the case of rotor blades of tail rotors, the coupling section of the rotor wing, which coupling section is not directly subjected to airflow, represents a region that is more favourable from the point of view of flow dynamics than is the transition region that is directly subjected to airflow. As a rule, the region of torsional movement leads to an increase in the cross section, which in a section subjected to airflow, such as the transition region, would result in increased drag. In contrast to this, in the coupling section the torsional movement is encased by the control tube, is already arranged within the fenestron pot, and thus remains aerodynamically ineffective.

Further embodiments, in particular of the corresponding control tube, which are not described in detail are obviously and expressly incorporated to form the subject of the present application.

The object mentioned in the introduction is furthermore met by a method for producing a rotor wing from a rotor blade, and for producing an integrated tension-torque-transmission element with a connecting eye made of a fibre-reinforced material, with the method involving the following steps:
a) placing at least partially ready-made fibre layers, if need be by scarf-joining intermediate layers, in a mould tool to produce a moulded blank;
b) curing the moulded blank under pressure and with heat;
c) at least in some regions milling the cured moulded blank that has been removed from the mould so as to give it its final contour.

The method according to the invention thus takes the unusual approach in that a component in fibre-reinforced composite design is not completely produced in its planned final contour, but instead, at least in some regions, is produced with significant overmeasure, and only in its cured state receives its final dimensions. According to the proposal, only the rotor blade of the rotor wing according to the invention is produced in its final dimensions, whereas the integrated tension-torque-transmission element is made in longer length and wider width when compared to its final dimensions. This is because, due to movements in the fibre layers, displacement during curing can occur in the moulded blank region of the tension-torque-transmission element, which displacement results in a qualitative loss in the moulded blank region of the laminate. Therefore the inside contour of the mould tool for the tension-torque-transmission element can be selected to be wider and longer than its final form. The outside contour of the tension-torque-transmission element is milled only after removing the rotor wing from the mould, so as to give it its final shape. As a result of this, in particular, a torque-transmission element of particularly high quality is obtained, because any moulded blank regions that may have been disturbed during production are subsequently milled off. Thus, this production method results in a tension-torque-transmission element that with the smallest possible dimensions provides optimal material use. Furthermore, after the moulded blank has cured, a variation in the width, for example, of the torque-transmission element is still possible, and in this way, if necessary, the torsional rigidity of the torque-transmission element can be changed. Providing the individual fibre layers ready-made with overmeasure also simplifies their cutting processes, so that preparation costs can be reduced.

Both dry fibres and already resin-pre-impregnated fibre layers, so-called prepregs, are suitable ready-made fibre layers. In order to increase the stability of the moulded blank and thus of the future rotor wing, in sections of the rotor wing that are particularly subjected to loads, for example in the region of a connecting section or of its transition section between the tension-torque-transmission element and the rotor blade, intermediate layers or filler layers can be scarf-joined. These reinforcement layers can comprise dimensions that either correspond to those of the remaining fibre layers or that differ from them and that only correspond to the regions to be reinforced. Moreover, reinforcement layers can have the same fibre orientation as the fibre layers, or they can have a fibre orientation that differs from this. For example, said reinforcement layers can extend at an angle of +/−45° to +/−90° so as to provide improved strength and rigidity to the sections to be reinforced.

According to an advantageous embodiment of the method according to the invention, a connecting eye in the tension-torque-transmission element is subsequently, in a step d), drilled or milled in a direction perpendicular to the plane of extension of the tension-torque-transmission element. The connecting eye and the surrounding laminate are dimensioned as a hole face and are subjected to load. As a result of it having been produced later, the laminate is undisturbed right up to the hole face. This also reveals the later production of the connecting eye, in that as a result of later drilling the hole face displays completely undisturbed fibre layers that are placed compactly one above the other. Consequently the tension-torque-transmission element can be produced in the smallest-possible dimensions because there is no need to calculate overmeasure for any fibre layers that have a lower load-bearing capacity and that are disturbed.

Figure 2:
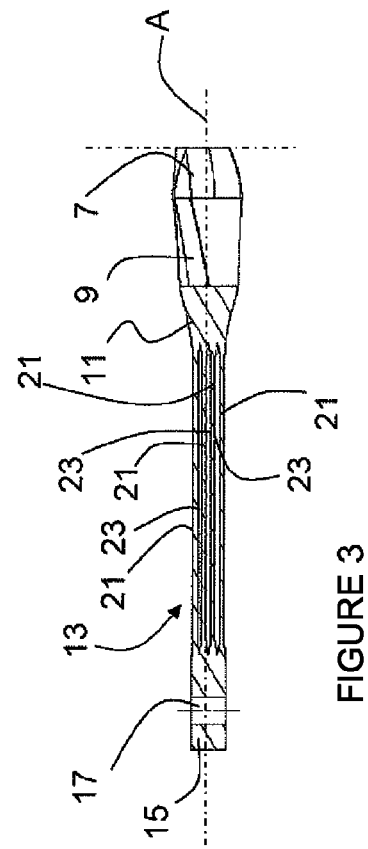
Figure 3:
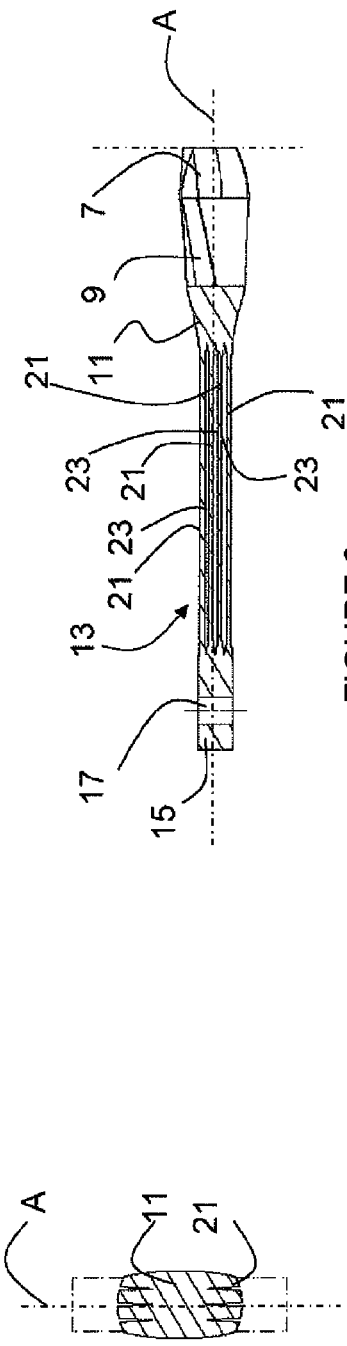
Figure 4:
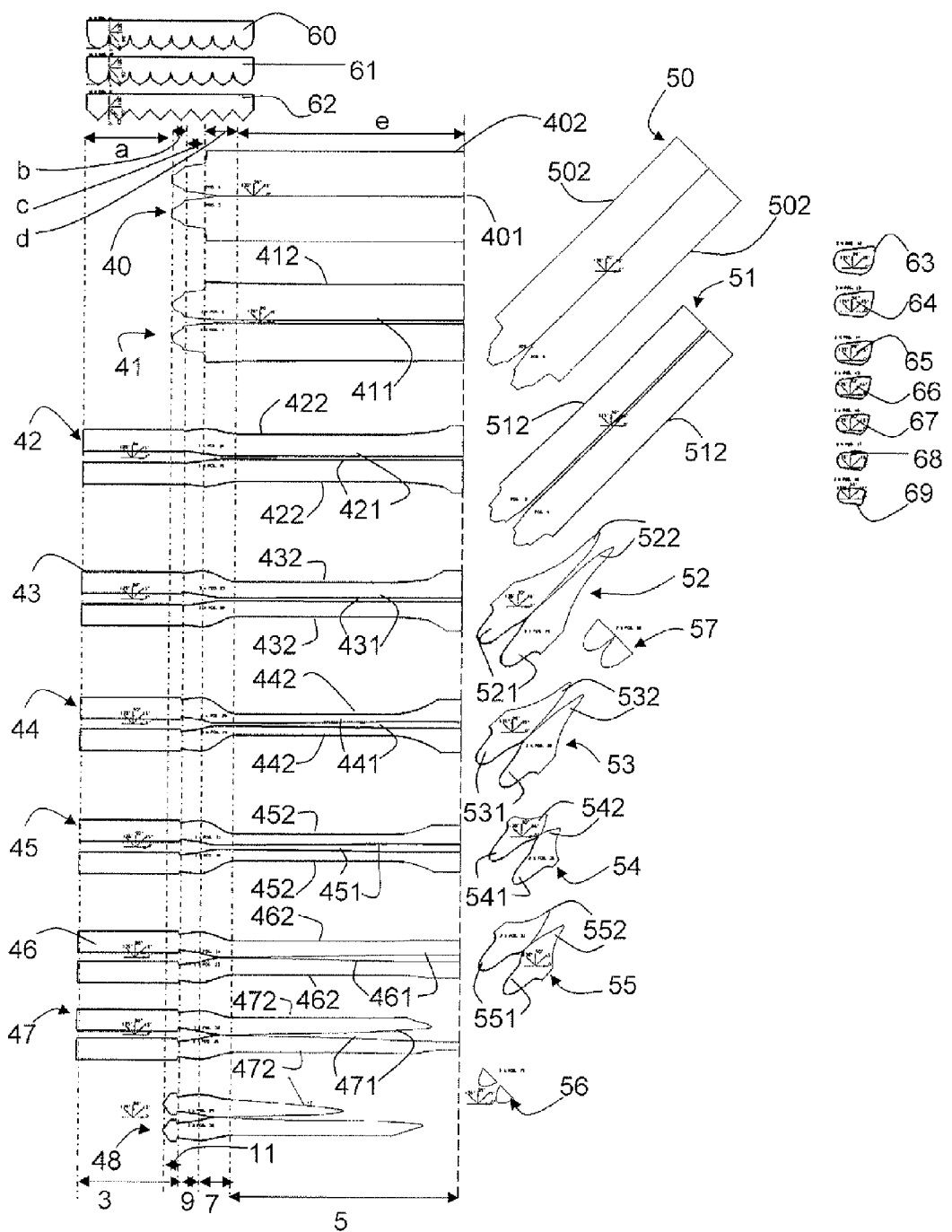
Figure 17:
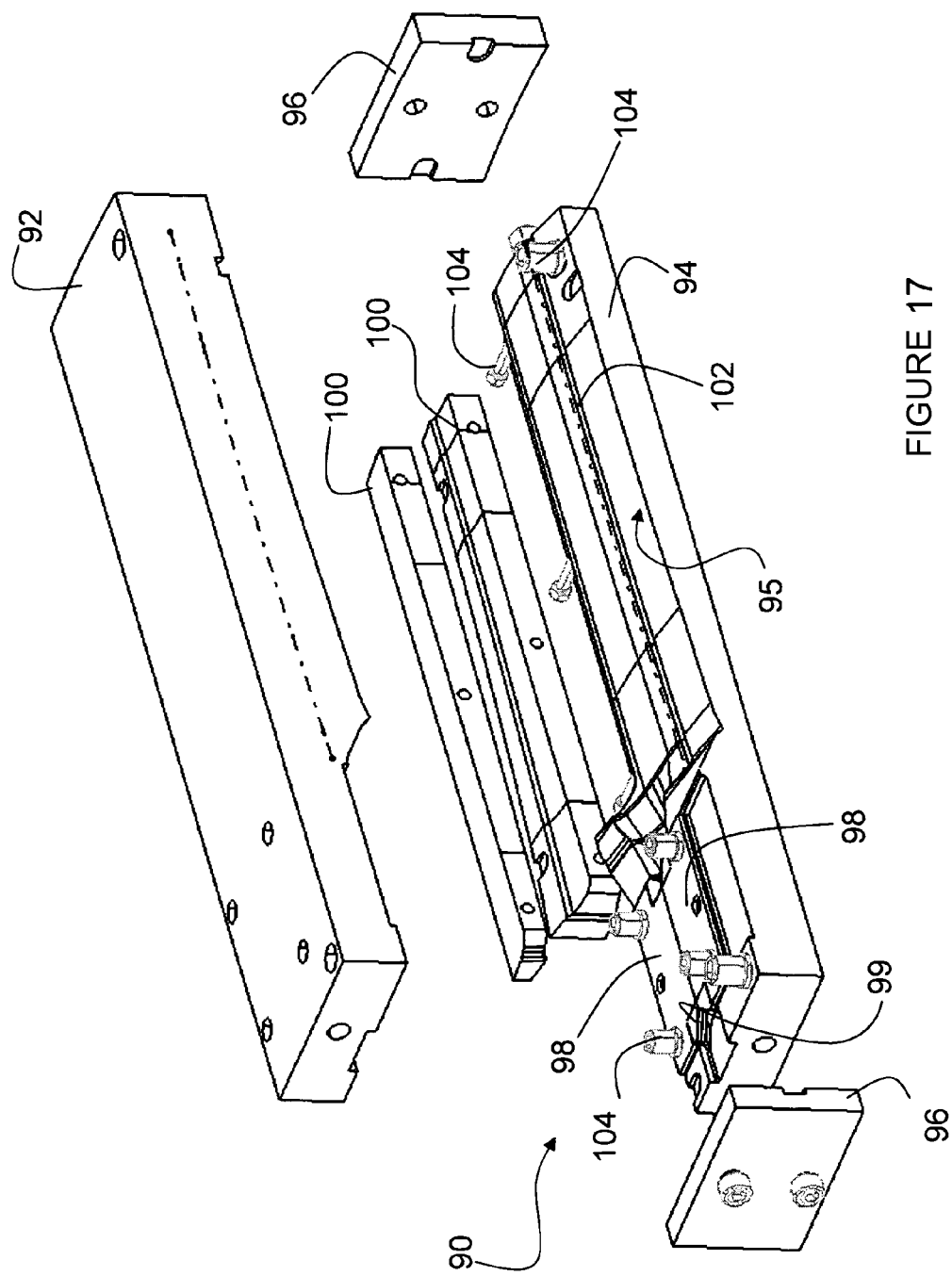

The principle of the invention is explained in more detail in an exemplary manner with reference to the drawing. The following are shown:

FIG. 1 a top view of a rotor wing;

FIG. 2 a cross section of the rotor wing shown by section line II-II of FIG. 1;

FIG. 3 a partial longitudinal section of the rotor wing shown by section line III-III of FIG. 1;

FIG. 4 templates relating to the fibre layers for producing the rotor wing;

FIG. 5 a cross section of the blade section of the rotor wing;

FIG. 6 a top view of the rotor wing, with the fibre layers being shown;

FIG. 7 a lateral view of the rotor wing;

FIG. 8 a top view of the rotor wing during its manufacture;

FIG. 9 a further top view of the rotor wing;

FIG. 10 a connecting eye of a tension-torque-transmission element with three lamellae;

FIG. 11 a lateral view of a tension-torque-transmission element with four lamellae;

FIG. 12 a partial view of a rotor wing and a control tube;

FIG. 13 a rotor wing with the control tube in place;

FIG. 14 a longitudinal section according to section line XIV-XIV of FIG. 13;

FIG. 15 a partial section view shown as detail XV in FIG. 14;

FIG. 16 a partial section view of the connecting eye shown as detail XVI in FIG. 14; and FIG. 17 a device for producing the rotor wing.

A rotor wing according to FIG. 1 essentially comprises a rotor blade 1 and a tension-torque-transmission element 3. The tension-torque-transmission element 3 connects the rotor blade 1 to the hub of a drive device (not shown). The rotor blade 1 and the tension-torque-transmission element 3 are designed in a single piece, wherein from a blade section 5 of the rotor blade 1 on the hub side a blade transition section 7 follows on, on which in turn there is a torque-transmission section 9. From the latter the tension-torque-transmission element 3 follows on with a blade-side connecting section 11, which in particular in top view makes a strongly conical transition to a significantly slimmer rectangular torque-transmission element 13. The latter expands on the hub side to form a club-shaped connecting section 15 that accommodates a circular connecting eye 17 that extends perpendicularly through said connecting section 15. The dot-dash line shows a contour line 19 that shows the manufacturing contour of the tension-torque-transmission element 3 during its manufacture.

As shown in the lateral view according to FIG. 3, the torque-transmission element 13 comprises four individual tape-shaped lamellae 21 that extend parallel to each other and are stacked, which lamellae enclose slots 23 of the same nature. At almost the same design height the torque-transmission element 13 makes a transition to the connecting section 15 on the hub side. In contrast to this, on the opposite connecting section 11, which is arranged on the blade side, said torque-transmission element 13 widens so that the connecting section 11 on the blade side has a conical shape also in the lateral view of FIG. 3. Said connection section 11, like the opposite connecting section 15, is essentially axially symmetrical relative to a symmetry axis or symmetry plane A, and in addition is laterally slotted, as shown in the section view according to FIG. 2, because the lamellae 21 end in it.

The blade section 5 comprises an aerodynamically effective profile in cross section, as shown in FIG. 5. Said profile is essentially elongated and almost axially symmetrical relative to a symmetry axis or symmetry plane B. The connecting blade transition section 7 (compare FIGS. 1 and 7) serves to establish a transition between the elongated profile of the blade section 5 and the compact cross section of the connecting ellipsoid torque-transmission section 9. Since the torque-transmission section 9 is considerably more compact, a strong cross-sectional change takes place in the blade transition section 7.

The rotor wing has a so-called angle of incidence of approximately 16° of its blade section 5 (or of its symmetry plane B) relative to its rotational plane (compare symmetry plane A), which angle is shown in FIG. 12. The torque-transmission section 9 serves to match the resulting different extension planes of the blade section 5 on the one hand, and of the tension-torque-transmission element 3 on the other hand. Furthermore, it is used as a contact face for a control tube 70 (compare FIGS. 12 to 15) that is described in detail later.

In the connecting blade-side section 11, which is even more strongly conical in design than the torque-transmission section 9, the cross-sectional adaptation between the ellipsoid torque-transmission section 9 and the almost rectangular tension-torque-transmission element 3 takes place. Said section 11 forms the transition to the lamellae 21 that form the torque-transmission element 13 and that with an essentially rectangular cross section and their elongated tape-like shape lead to the connecting section 15 on the hub side.

The rotor wing according to the invention is produced in a fibre-reinforced composite design. The individual fibre layers from which it is comprised (compare also FIG. 6) partly extend from the connecting section 15 on the hub side through the tension-torque-transmission element 3 by way of the torque-transmission section 9, the blade transition section 7, through the blade section 5 and up to its blade tip 6. Due to the very different cross-sectional shapes, in particular of the blade section 5 and of the connection section 15 on the hub side, not all the fibre layers completely extend through the entire rotor wing. However, those fibre layers that form the lamellae 21 extend from the connecting section 15 on the hub side through the entire rotor wing up to the blade tip 6 of said rotor wing. They form the main structure of the rotor wing.

FIG. 4 shows a composition of the fibre layers for forming the rotor wing. The fibre layers 40 to 48, which are shown on the left-hand side, one on top of the other, are arranged in pairs, wherein their facing insides 401, 411, 421 etc. are associated with a future leading edge 25 of the rotor blade 1 (compare FIG. 5), while their margins 402, 412, 422, 432 etc. that face away from each other are correspondingly associated with a trailing edge 27 of the rotor blade 1. They are arranged according to their position in the rotor wing. Starting from the left-hand side, the rectangular sections a and b together represent the manufacturing contour 19 (FIGS. 1 and 6) of the tension-torque-transmission element 3. Section b forms what will become the connecting section 11 on the blade side. The connecting section 15 on the hub side is not separately shown in FIG. 4. Connected to the tension-torque-transmission element 3 is the torque-transmission section 9, which corresponds to section c. The blade transition section 7 is formed by section d of the fibre layers 40 to 48. Finally, section 5 of the rotor wing is formed by the fibre layers 40 to 48 with their sections e as well as the additional fibre layers 50 and 51.

The remaining fibre layers, namely the layers 52 to 57, the layers 60 to 62, which have been taken together in a comb-shaped manner, and the filler layers 63 to 69 are scarf-joined between the fibre layers 40 to 57.

The fibre layers 42 to 47 represent those fibre layers that extend through the entire rotor wing from its connecting section 15 on the hub side up to its blade tip 6. They comprise a unidirectional fibre material whose fibres extend in the direction of longitudinal extension of the fibre layers 42 to 47. In transverse direction to the flow of the fibres, the fibres are held together chemically or mechanically by being sewn.

While the fibre layers 40, 41 and 48 also comprise unidirectional fibre material, they do not, however, extend through the entire rotor wing. The fibre layers 50 to 57 as well as 63 to 69 shown on the right-hand side of it (see also FIG. 8) comprise multiaxial fibre material whose fibre directions extend at a right angle to each other but not so as to be parallel or orthogonal to their margins 502, 512. The layers 50 to 57 are therefore shown to be rotated by 45°, and the layers 60 to 62 by 90° relative to their end position in the rotor wing. They are predominantly positioned or scarf-joined between the fibre layers 40 to 48 so that between each two fibre layers 40 to 48 with unidirectional fibre orientation at least one fibre layer extends, whose fibres are arranged at an angle of +/−45° or 90° relative to the unidirectional fibres. In this way the fibre package made thereof, and thus the rotor wing, gains adequate stability also in transverse direction.

Section e of the fibre layers 40 to 48 thus forms the blade section 5 of the rotor blade 1. Corresponding to the future position of the fibre layers 40, 41 etc. in the profile of the rotor wing, the insides 401, 411, 421 etc. that face each other extend through almost in a straight line in section e. In contrast to this, the sides 422, 432, 442 etc. that are associated with the future trailing edge 27 of the rotor wing are incised in order to leave room for a foam core 39 in the interior of the rotor wing (compare FIG. 5). Since the height of the profile of the blade section 5 decreases in the direction of its blade tip 6, the fibre layers 47, 48 do not extend right through to the blade tip 6.

The fibre layer 40 and the multiaxial fibre layer 50 together form a blade skin that encloses the entire profile of the rotor blade 1. They do not yet extend through the entire rotor wing, and thus do not absorb any centrifugal forces during rotation of the rotor wing. In contrast to the above, the through-layers 42 to 47 take part in the load absorption. They are arranged two-fold to three-fold one on top of the other and, together with intermediate layers, for example the scarf-joined fibre layers 52 to 57 and the filler layers 63 to 69, form a stable blade body which not only ensures the stability of the profile form but also assumes the load removal in longitudinal direction of the rotor wing. As blade bodies they thus fulfill the functions not only of a stable shell but also of a supporting framework, which has load-bearing capacity, of earlier rotor blade constructions.

The fibre layers 52 to 57 (see also FIG. 6) that are also multiply scarf-joined, predominantly form the blade transition section 7, the torque-transmission section 9 and the connecting section 11 on the blade side. With their rounded sides they project into the connection 11 on the blade side where they form the region of the space of the slots 23 between the lamellae 21, which space is exposed in the connecting torque-transmission element 13. In contrast to the above, the pointed region 522, 532, 542, 552 of the fibre layers 52 to 55 takes part in the formation of the blade transition section 7 and also protrudes right into the blade section 5 where it ends at the foam core 39.

The comb-shaped fibre layers 60, 61, 62 in the connecting section 15 correspond to their rounded sections 521, 531, 541 and 551 (FIG. 4) in the connecting section 11 on the blade side. At their incisions they are separated from each other and on the left-hand margin of the section a they are scarf-joined between the sections a of the fibre layers 42 to 47. They form the connecting section 15 on the hub side at the height of the slots 23 of the torque-transmission element 13.

Finally, the filler layers 63 to 69 are multiply attached in the region of the blade transition section 7 and of the torque-transmission section 9 essentially on the outside of the layers 42 to 48, in other words underneath the blade skin of the fibre layers 40 and 50. They result in an increase in the cross section of the blade transition section 7 and of the torque-transmission section 9, without the through-fibre layers 42 to 48 being excessively deflected. Such deflection, in which the fibre layers loose their straight-line through extension, would otherwise when subjected to centrifugal forces result in excessive transverse tensile strain that might cause delamination of the individual fibre layers. In order to nevertheless achieve the required design height of the blade transition section 7 and of the torque-transmission section 9, the filler layers 63 to 69 with outwardly reducing size are put in place quasi in a pyramid shape, and are then only covered by the fibre layers 40, 50 that form the blade skin.

FIG. 5 shows a diagrammatic profile view of a rotor wing in the region of the blade section 5. It comprises a front or leading edge 25 and an opposing trailing edge 27 with a flat droplet form with a top 29 and a bottom 31. Both on the top 29 and on the bottom 31 the profile comprises a step 33, to which on the surface from the leading edge 25 of the blade section 5 an erosion protection device (not shown) for example made of metal, is applied. The profile of the blade section 5 from the outside to the inside is then formed by the fibre layer 40 that envelopes the entire profile as a blade skin. It abuts the leading edge 25 of the blade section 5. Underneath it there follows the fibre layer 50, which also abuts to the front edge 25. While the first fibre position 40 with the fibre direction is designed in longitudinal direction of the rotor wing, the fibres of the fibre layer 50 extend at an angle of approximately 45° to it. The next following fibre layer comprises a unidirectionally aligned fibre material that is adjacent to a fibre material, again multiaxial, of layer 51. This is followed by the other fibre layers which cannot only be used individually but also multiply for each rotor wing. The fibre layers envelope a foam core 39 that is arranged more closely to the trailing edge 27 of the blade section 5 so that the centre of gravity of the profile of the blade section 5 is in a frontal region in which the heavier fibre layers are located.

FIG. 6 shows a top view of the position of the individual fibre layers 40 to 55 in an exemplary manner. To the extent that some of them cover each other fully, such as the fibre layers 40 and 50, they only comprise one contour line. Since on the other hand they are not designed to be axially symmetrical, but instead in particular their trailing edges 421, 422, 432, etc. (compare FIG. 4) have incisions of different depth in order to leave space for the foam core 39, the associated fibre layers 41, 42, 43 etc. can be identified in FIG. 6 by several contour lines.

The fibre layers 40 to 55 form part of the blade section 5, the blade transition section 7, the torque-transmission section 9 and the connecting section 11 on the blade side. Furthermore, the fibre layers 42 to 47 form the entire tension-torque-transmission element 3 and in that location the manufacturing contour 19. At that location they are in principle alternately layered with the fibre layers 60 to 62, shown in a comb-like manner in FIG. 4, as has been described in relation to blade section 5. In FIG. 6 the tension-torque-transmission element 3 is shown so as to be tilted by the angle of incidence because the symmetry plane B of the blade section 1 is arranged parallel to the blade plane.

FIG. 7 shows a lateral view of part of the rotor wing, namely of the tension-torque-transmission element 3 and of the rotor blade 1 with its torque-transmission section 9 and the blade transition section 7. In this illustration, too, the position of the trailing edge 27 of the blade section 5 shows the angle of incidence of said blade section 5 relative to the tension-torque-transmission element 3. FIG. 7 in particular shows the design of the tension-torque-transmission element 3 of lamellae 21, which are arranged one on top of the other and that are arranged parallel, with three slots 23 situated in-between. The latter are formed by the fibre layers 42 to 47 that are unidirectional and extend through the entire rotor wing, wherein in each case three of the fibre layers 42 to 47 form a lamella 21. Originating from the connecting section 15 on the hub side, said fibre layers 42 to 47 extend completely flat and planar, without any deflection, through the torque-transmission element 13 into the connecting section 11 on the blade side. Only in the torque-transmission section 9 do they make a certain deviation before making a transition, within the blade transition section 7, to the plane of the blade section 5, which is tilted by the angle of incidence of 16° relative to the tension-torque-transmission element 3. This deviation takes place along a length of approximately 25 mm and is so small that even under tensile load during operation as a result of centrifugal force it does not cause any damaging shearing forces that would result in delamination among the layers.

The lamellae 21 of the torque-transmission element 13, which lamellae 21 are separated from each other by slots 23, in the connecting section 15 on the hub side and in the connection 11 on the blade side form a homogeneous layer packet that is higher than in the torque-transmission element 13. This is achieved on the one hand by the layers 60 to 62 that are shown in a comb-like manner in FIG. 4, and on the other hand on the connecting section 11 on the blade side the round sections 521, 531 etc. of the fibre layers 52, 53 etc. This is more clearly shown in detail in FIGS. 10 and 11.

FIG. 8 shows a detail region of the blade transition section 7, of the torque-transmission section 9 and of the connecting section 11 on the blade side. In this region the rotor wing gains design height in the direction from the torque-transmission element 13. In order to be able to lead the fibre layers 42 to 47 from the torque-transmission element 13, due to the angle of incidence, with the least possible deflection through the torque-transmission section, while at the same time gaining the required design height, in particular the cross section of said torque-transmission section is supplemented by filler layers 63 to 69. This results in a cross section of adequate size in order to, in particular, be able to install a control tube (compare FIG. 13) in the torque-transmission section.

FIG. 9 shows a section view of the rotor wing approximately in its symmetry plane B. As a result of this the foam core 39 (compare FIG. 5) is visible, which with the exception of the blade tip 6 extends through the entire blade section 5 into the connecting section 11 on the blade side. Said foam core 39 is used to compensate for uneven areas in the fibre layers and prevents excessive pressure being exerted on the layers during production, and also prevents any displacement. Moreover, by means of its dimensioning the centroidal axis of the rotor wing can be influenced, which favourably extends as near as possible to the front 25 of the blade section.

FIG. 10 shows a perspective view of the connecting section 15 on the hub side, of the tension-torque-transmission element 3, with three lamellae 21. As is also shown in the lateral view according to FIG. 11 of a tension-torque-transmission element with four lamellae, the lamellae 21 make a gradual transition to the compact connecting section 15. This is achieved by scarf-joining the fibre layers 60, 61, 62 that are positioned between the fibre layers 42, 43 or 44, 45 or 46, 47 (see FIG. 4). As a result of this the top view shows triangular transition regions that avoid a rigidity step between the element 13 with its spaced-apart lamellae 21 on the one hand, and the compact connecting section 15 on the other hand. Consequently, bending stress in the outer lamellae 21 can be significantly reduced, whose load peaks might otherwise result in failure of the lamellae 21. Instead, scarf-joining the fibre layers 60, 61, 62 ensures a continuous increase in torsional rigidity between the torque-transmission element 13 and the connecting section 15. The opposite connecting section 11 is constructed analogously by scarf-joining the fibre layers 52 to 57.

FIG. 12 shows a partial view of a rotor blade 1 and a control tube 70 before it is threaded or placed on the rotor blade 1 by way of the tension-torque-transmission element 3. Said control tube 70 comprises a base body 71, which in principle is tubular, which on the side of the rotor blade comprises a disc-shaped bearing arrangement section 72 of a larger diameter, and on the side of the hub comprises a likewise disc-shaped bearing arrangement section 74 of smaller diameter. In between, a control lever 76 is radially distant in a triangular shape from the base body 71. On the blade side the control tube 70 comprises an ellipsoid threading opening 80 (covered up in FIG. 12), into which during installation the rotor wing 1 is inserted with the tension-torque-transmission element 3 front-most. Opposite the threading opening 80 there is a circular opening 81 from which in the operating state the tension-torque-transmission element 3 projects at least in part.

FIGS. 13 and 14 show the installed state in a projection and in a section view. Accordingly, the control tube 70 completely covers both the torque-transmission section 9 and the connecting section 11 on the blade side, and covers approximately half of the torque-transmission element 13. In the region of its bearing arrangement section 72 the interior of the control tube 70, directly adjacent to the threading opening 80, comprises an ellipsoid inner cone 82 (compare detailed view in FIG. 15), which fits onto the also ellipsoid torque-transmission section 9. This results in contact over the entire area of the generated surface of the torque-transmission section 9, at which surface the control tube 70 is bonded to the rotor blade 1. The torque-transmission section 9 thus at the same time represents a coupling section between the rotor blade 1 and the control tube 70.

In order to correctly centre the control tube 70 on the rotor blade 1, during the bonding process mounting wedges 84 are inserted into the circular opening 81 opposite the threading opening 80, which mounting wedges are supported by the tension-torque-transmission element 3.

FIG. 16 shows a detailed view of the connecting section 15 on the hub side. The connecting eye 17 comprises protective rings 86 that have been installed on both sides of the connecting section 15. They protect the fibre layers of the connecting section 15 on the fork-shaped clamping position of the tension-torque-transmission element 3 in the fenestron pot. They comprise a special woven fabric of low frictional resistance and provide good protection against wear resulting from friction.

FIG. 17 shows a mould tool 90 or a so-called FEMI production means, made of aluminium, for producing the rotor blade 1. Said mould tool 90 comprises a top mould 92, a bottom mould 94 with a release plane 95 of the bottom mould 94, two lateral end plates 96, several slotted metal sheets 98 with beveled edges 99, and two slide-in devices 100. They form exchangeable components of the top mould 92 and of the bottom mould 94. On the trailing edge 27 of the future rotor blade 1 a resin groove 102 extends in longitudinal direction of the bottom mould 94. Studs 104 are used as positioning aids in order to ensure precise positioning in particular of the top mould 92 on the bottom mould 94.

In order to be able to successfully remove the rotor blade 1 from the mould, the release planes between the top mould 92 and the bottom mould 94, of which FIG. 17 only shows the release plane 95 of the bottom mould 94, must always rest against the widest contour line of the rotor blade 1. Due to the torque-transmission section 9 between the tension-torque-transmission element 3 and the blade section 5, or due to the angle of incidence of the rotor blade 1, the release plane 95 extends in two planes that are tilted relative to each other by the angle of incidence. This is the reason for the geometric complexity of the mould tool 90.

As already shown in FIG. 4, the blade section 5, the blade transition section 7 and the torque-transmission section 9 are produced to their final contours. The fibre layers 40-51 are therefore in their corresponding regions c, d and e ready-made to the final shape of the rotor blade 1. In contrast to this, the tension-torque-transmission element 3 is only milled to its final shape after it has been removed from the mould.

During the production of the rotor blade 1, excess resin, in particular from the torque-transmission element 13, can issue from the mould tool 90 and can block it up or gum it up. Thereafter, the mould tool 90 can only be opened with considerable effort. Therefore in the bottom mould 94, in the region of the future trailing edge 27 of the blade, a resin groove 102 has been made by milling, which resin groove 102 collects excessive resin and provides adequate collection space for the issuing resin.

After a release agent has been applied to the release planes of the top mould 92 and of the bottom mould 94, laying of the ready-made fibre layers 40-69 commences. The laying process in the bottom mould 94 follows a laying plan (compare FIG. 4), which specifies the order and the number of layers. Finally, the foam core 39 is put in place and the fibre layers that cover it are applied. In order to obtain the lamella structure of the torque-transmission element 13, slotted metal sheets 98 are placed between the fibre layers 42-47 which form the lamellae 21. Their dimensions correspond to those of the future slots 23. On the ends, end plates 96 are installed on the mould tool 90 so that the future rotor wing will be heated evenly from all sides.

On its front 25 the blade section 5 comprises an erosion protection device that is integrally produced. To this effect, after the fibre layers 40-69 have been placed in the mould tool 90 and after the tool 90 has been closed, the slide-in devices 100, which up to now served as placeholders for the erosion protection device, are removed. After this the erosion protection device is applied to the still soft fibre layers 40-69, and the tool 90 is closed with other slide-in devices (not shown). They take into account the inserted erosion protection device and replace the slide-in devices 100. Subsequently the rotor wing is cured under the influence of pressure and heat. In this way the production of the erosion protection device, which at first is produced separately, can economically be integrated in the production of the rotor blade. Furthermore, as a result of the integral design of the erosion protection device the blade section 5 features a high aerodynamic quality.

As a result of the change in temperature during the curing process the aluminium mould or the mould tool 90 extends to a greater degree than does the fibre-reinforced material of the rotor wing. During heating up, the mould tool 90 experiences a substantial change in length, in particular in the direction of longitudinal extension, and advantageously stretches the fibres of the rotor wing. As a result of this, in particular the unidirectional fibre layers are aligned in longitudinal direction of the rotor wing and thus in the direction of centrifugal force, and are quasi pre-stressed under tension. The rotor wing cures in this state. During subsequent cooling, the mould tool 90 contracts, while the rotor wing largely maintains its length. After this the end plates 96 have to be removed because otherwise pressure might be exerted on the rotor wing, which pressure could damage it.

Since the rotor wing that has been described in detail above is only one exemplary embodiment, said exemplary embodiment can in the usual way be modified to a large extent by the average person skilled in the art without leaving the scope of the invention. In particular, the specific cutting of the fibre layers and the order of their arrangement can take place in a form that differs from that described in this document. Likewise, the mechanical coupling on the connecting section on the hub side can be designed in some other form if this is necessary for reasons of space or for design reasons. Furthermore, the use of the indefinite article "a" or "one" does not preclude the possibility of the respective characteristics being present in plural numbers.

LIST OF REFERENCE CHARACTERS

1 Rotor blade
3 Tension-torque-transmission element
5 Blade section
6 Blade tip
7 Blade transition section
9 Torque-transmission section
11 Connecting section on the blade side
13 Torque-transmission element
15 Connecting section on the hub side
17 Connecting eye
19 Manufacturing contour
21 Lamellae
23 Slots
25 Leading edge 27 Trailing edge
29 Top
31 Bottom
33 Step
39 Foam core
40 to 48 Unidirectional fibre layers
401, 411 etc. Leading edge
402, 412 etc. Trailing edge
50 to 57 Multiaxial fibre layers
521, 531 etc. Round section
522, 532 etc. Pointed section
60 to 62 Comb-shaped fibre layers
63 to 69 Filler layers
70 Control tube
71 Base body
72 Bearing arrangement section on the blade side
74 Bearing arrangement section on the hub side
76 Control lever
78 Drainage hole
80 Threading opening
81 Opening
82 Cone
84 Mounting wedge
86 Protective rings
90 Mould tool
92 Top mould
94 Bottom mould
95 Release plane
96 End plate
98 Slotted metal sheets
99 Edge
100 Slide-in device
102 Resin groove
104 Stud
a to e Sections of the Fibre layers 40 to 48
A, B Symmetry axes or symmetry planes

The invention claimed is:

1. A fibre-reinforced rotor wing for a tail rotor of a rotary wing aircraft, the wing comprising:
a rotor blade having a blade body with an aerodynamic profile and a blade skin;
a tension-torque-transmission element extending from the rotor blade via a blade side connecting section, the blade side connecting section tapering from the rotor blade to the tension-torque-transmission element; and
a hub side connecting section having a connecting eye and extending from a second end of the tension-torque-transmission element;
wherein the blade body, the tension-torque-transmission element, the hub side connecting section and the blade side connecting section are formed by a plurality of unidirectional fibre layers, each fibre layer extending from the hub side connecting section to a tip of the blade body, the fibre layers forming stacked spar tapes;
wherein the tension-torque-transmission element is formed by lamellae of the stacked spar tapes;
wherein additional fibre layers are positioned between the stacked spar tapes in the blade side and hub side connecting sections such that the lamellae are spaced apart from one another in the tension-torque-transmission element; and
wherein the additional fibre layers are scarf joined between the unidirectional fibre layers to provide triangular transition regions between the lamellae and the blade side and hub side connecting sections.

2. The rotor wing according to claim 1 wherein the blade side connecting section has an ellipsoid section adjacent to the rotor blade and a conical section adjacent to the tension-torque-transmission element, the rotor wing further comprising:
a control tube extending from an intermediate region of the tension-torque-transmission element over the blade side connecting section, the control tube having a tubular base body with a control lever radially distant from the tubular base body, the tubular body defining an ellipsoid threaded opening on a blade side and a circular opening on a tension-torque-transmission element side, the tubular body defining an ellipsoid inner cone sized to mate with the ellipsoid section of the blade side connecting section.

3. The rotor wing according to claim 1 further comprising coated films positioned between the spaced apart lamellae, wherein the films prevent the lamellae from adhering to one another and decouple the lamellae from each other to prevent transmission of shearing strain at facing boundary surfaces of adjacent lamellae.

4. The rotor wing according to claim 1 wherein each transition region is adapted to provide a continuous increase in torsional rigidity across the transition region.

5. The rotor wing according to claim 1 wherein the triangular transition regions between the lamellae of the tension-torque-transmission element and the blade side and hub side connecting sections are almost stepless transitions.

6. The rotor wing according to claim 1 wherein the fibre layers of the stacked spar tapes in the blade side connecting section are adapted to rotate 10° to 20° relative to a rotational plane of the rotor blade and corresponding to an angle of incidence of the rotor blade relative to the rotational plane.

7. The rotor wing according to claim 1, characterised by an essentially rectangular cross section of the stacked spar tapes.

8. The rotor wing according to claim 1, characterised by a layered and staggered arrangement of the stacked spar tapes in the blade body for forming the aerodynamic blade profile.

9. The rotor wing according to claim 1, characterised by a different width of the stacked spar tapes depending on their height position in the tension-torque-transmission element.

10. The rotor wing according to claim 1, characterised in that the additional fabric layers have a fibre orientation of ±45°.

11. The rotor wing according to claim 1 wherein the connecting eye is configured for attachment of the rotor blade to a drive device by way of a bolt that essentially extends perpendicularly to a plane of extension of the tension-torque-transmission element.

12. The rotor wing according to claim 1 further comprising a separate control tube for transmitting control forces to the rotor wing, with an also essentially cylindrical connecting section for tying the control tube to the rotor blade, characterised in that the blade side connecting section of the rotor wing and the connecting section of the control tube comprise a corresponding cross-sectional shape for positive-locking force transmission of control forces between the rotor blade and the control tube.

13. A method for producing the rotor wing according to claim 1, from the rotor blade and from the tension-torque-transmission element made of a fibre-reinforced material in the following steps:
a) placing ready-made contoured fibre layers in a mould tool by scarf-join intermediate layers in the tension-torque-transmission element and in the rotor blade;
b) curing the moulded blank under pressure and with heat;
c) milling the cured moulded blank that has been removed from the mould so as to give it its final contour.

14. The method according to claim 13, characterised in that subsequently in a step d) the connecting eye is made in the cured tension-torque-transmission element.

15. The method according to claim 14, characterised in that the connecting eye is drilled/milled in the tension-torque-transmission element.

* * * * *